United States Patent
Gudmondson et al.

(10) Patent No.: US 7,339,628 B2
(45) Date of Patent: Mar. 4, 2008

(54) METHOD AND APPARATUS TO IMPROVE DECODING OF COMPOSITE VIDEO SIGNALS

(75) Inventors: Daniel Gudmondson, Austin, TX (US); John L. Melanson, Austin, TX (US); Rahul Singh, Austin, TX (US); James A. Antone, Austin, TX (US); Ahsan Habib Chowdhury, Austin, TX (US); Krishnan Subramoniam, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 509 days.

(21) Appl. No.: 10/964,547

(22) Filed: Oct. 13, 2004

(65) Prior Publication Data
US 2006/0078054 A1     Apr. 13, 2006

(51) Int. Cl.
*H03M 1/12*     (2006.01)

(52) U.S. Cl. ............... 348/572; 348/441; 348/505; 348/544; 348/571

(58) Field of Classification Search ........ 348/571–572, 348/441, 553–555, 448, 457, 558, 638–639, 348/542, 544, 446; 375/240.25; *H03M 1/12; H04N 9/64*
See application file for complete search history.

(56) References Cited

U.S. PATENT DOCUMENTS

| | | | | |
|---|---|---|---|---|
| 6,441,860 B1 * | 8/2002 | Yamaguchi et al. | ........ | 348/555 |
| 6,833,875 B1 * | 12/2004 | Yang et al. | ............... | 348/665 |
| 7,102,690 B2 * | 9/2006 | Lee et al. | ................ | 348/542 |
| 7,102,692 B1 * | 9/2006 | Carlsgaard et al. | ......... | 348/572 |

* cited by examiner

*Primary Examiner*—Trang U. Tran
(74) *Attorney, Agent, or Firm*—Wong, Cabello, Lutsch, Rutherford, & Brucculeri, LLP

(57) ABSTRACT

Video decoder systems in which both the analog-to-digital converter and the composite decoder are driven by the stable sample clock, such as a crystal source. The outputs of the composite decoder are provided to a source rate converter, having an output that is provided to a digital output formatter. The digital output formatter is driven by the output clock, which may be locked to the source clock if desired. The output clock is developed by a clock generator which may be one of several different types, including a fractional N synthesizer, a direct digital synthesizer or a puncture clock.

12 Claims, 5 Drawing Sheets

METHOD AND APPARATUS TO IMPROVE DECODING OF COMPOSITE VIDEO SIGNALS

BACKGROUND OF THE INVENTION

1. Field of the Inventions

The invention generally relates to video decoders, and more specifically to decoding of composite input video signals.

2. Description of Related Art

There is a large surge in the use of digital video devices today. Examples include: digital televisions, LCD TVs and monitors, DVD recorders, personal video recorders, PC video cards, video capture and streaming applications, and video conferencing. In many cases, these units need to receive an analog video signal, which may be one of the composite signals, such as NTSC, PAL or SECAM; s-video; component video or RGB. It is then desirable to produce the proper digital output, such as eight or ten bit ITU-R BT 656. It is preferred that all the video decoding be done in a single chip for all of these formats. The decoder not only has to handle composite signals, which means it must be able to determine the chroma and luma values, but it also must handle vertical blanking interval (VBI) data and handle VCRs, which are unstable devices.

In many cases, accuracy of the composite decoding is reduced due to clocking errors and noise injection in conventional decoding designs. It is desirable to improve the decoding accuracy.

SUMMARY OF THE INVENTION

In a system according to the present invention, composite video decoding is improved by using a stable clock source, such as a crystal, to clock the decoding process. By use of this stable clock, clocking errors and noise injection are reduced.

In systems according to the invention, both the analog-to-digital converter and the composite decoder are driven by the stable sample clock. The outputs of the composite decoder are provided to a source rate converter, which has an output that is provided to a digital output formatter. The digital output formatter is driven by the output clock, which may be locked to the source clock if desired. The output clock is developed by a clock generator which may be one of several different types, including a fractional N synthesizer, a direct digital synthesizer or a puncture clock. This allows simplified design of the decoder.

DETAILED DESCRIPTION OF THE PREFERRED EMBODIMENT

Figure 1:
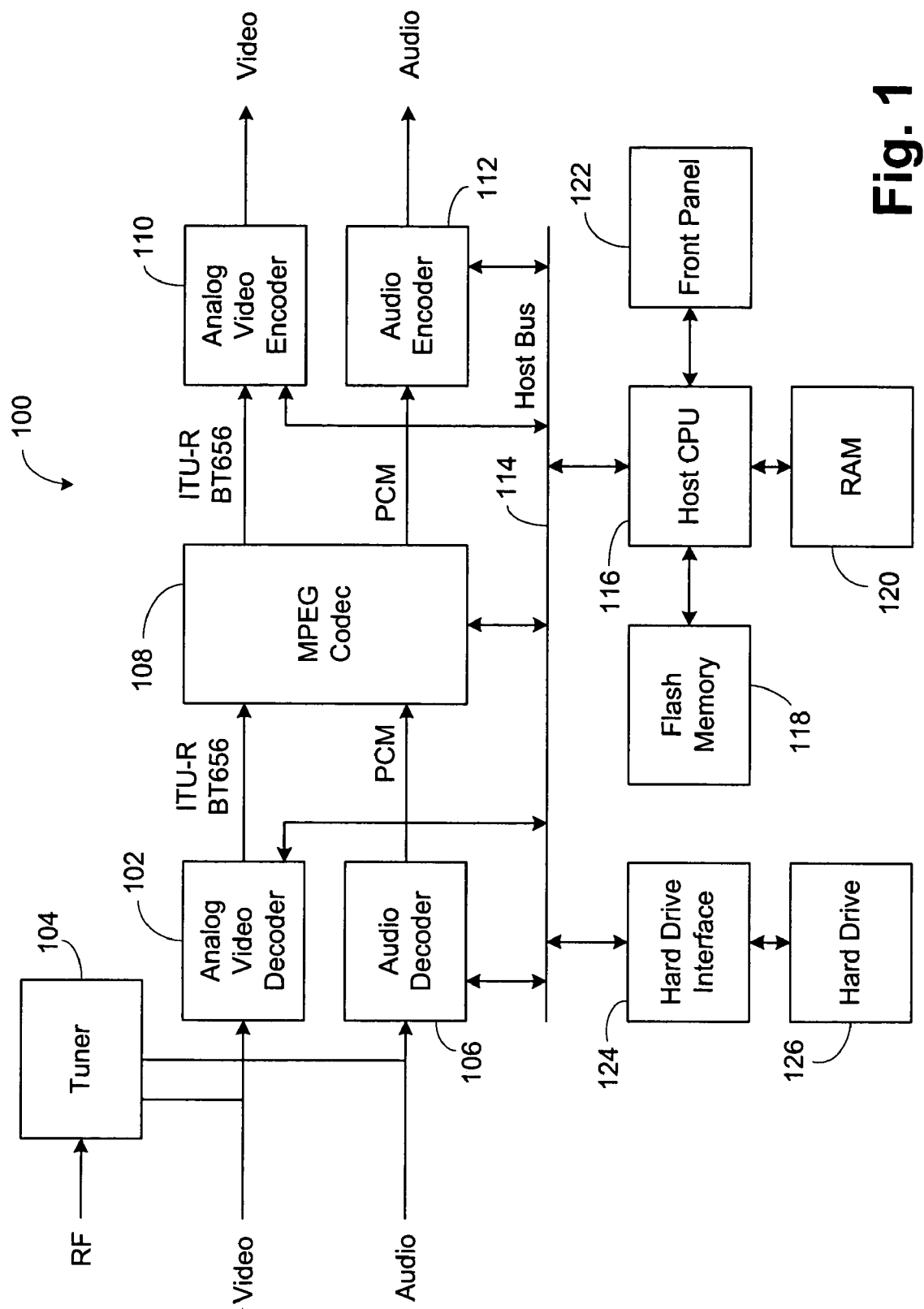
FIG. 1 displays a block diagram of an exemplary personal video recorder using an analog video decoder according to the present invention.

Referring now to FIG. 1, an exemplary personal video recorder (PVR) 100 is shown. This is an exemplary use of analog video decoder 102, and it is understood that the analog video decoder can be used in multiple applications including digital televisions, LCD TVs, DVD recorders, video capture situations, and the like. A radio frequency or broadcast signal is provided to a tuner 104. The tuner 104 provides both video and audio outputs. The video output from the tuner 104 or a video signal from an external connection is provided to analog video decoder 102. The audio signal from the tuner 104 or an external audio signal is provided to an audio decoder 106. The output in the analog video decoder 102 is preferably an ITU-R (International Telecommunication Union-Radio-Communication) BT (Broadcasting Service-television) 656 format digital signal, which is either an eight or ten bits signal. This is provided to an MPEG (Moving Pictures Expert Group) codec 108 to perform video compression in the digital domain. Similarly, the audio decoder provides a PCM signal to the MPEG codec 108 to allow it to perform compression of the audio signal. The MPEG codec 108 in output mode provides an ITU-R BT 656 digital stream to an analog video encoder 110, which in turns produces an analog video signal output. Similarly, the MPEG codec 108 provides a PCM digital signal stream to an audio encoder 112, which provides an analog audio signal output.

The MPEG codec 108 is connected to a host bus 114 of a host CPU 116. The host CPU 116 performs processing operations and controls the various devices located in the PVR 100. The host CPU 116 is connected to flash memory 118 to hold its program and RAM 120 for data storage. The host CPU 116 also interfaces with a front panel 122. Since this is a video recorder, a hard drive interface 124 is also connected to the host bus 114, with a hard drive 126 connected to the hard drive interface. The various encoders 102 and 106 and decoders 110 and 112 are also connected to the host bus 114 to allow control and setup by the host CPU 116.

In operation, audio and video would be provided to the analog video decoder 102 and the audio decoder 106, which would then provide their digital streams to the MPEG codec 108. The host CPU 116 would program the MPEG codec 108 to transfer data to the hard drive interface, and thus to the hard drive 126, for storage. The host CPU 116 could at a later time direct data to be transferred from the hard drive 126 to the MPEG codec 108 for playback.

Thus it can be seen that an analog video decoder 102 is an important part of such analog-to-digital video devices.

Figure 2:
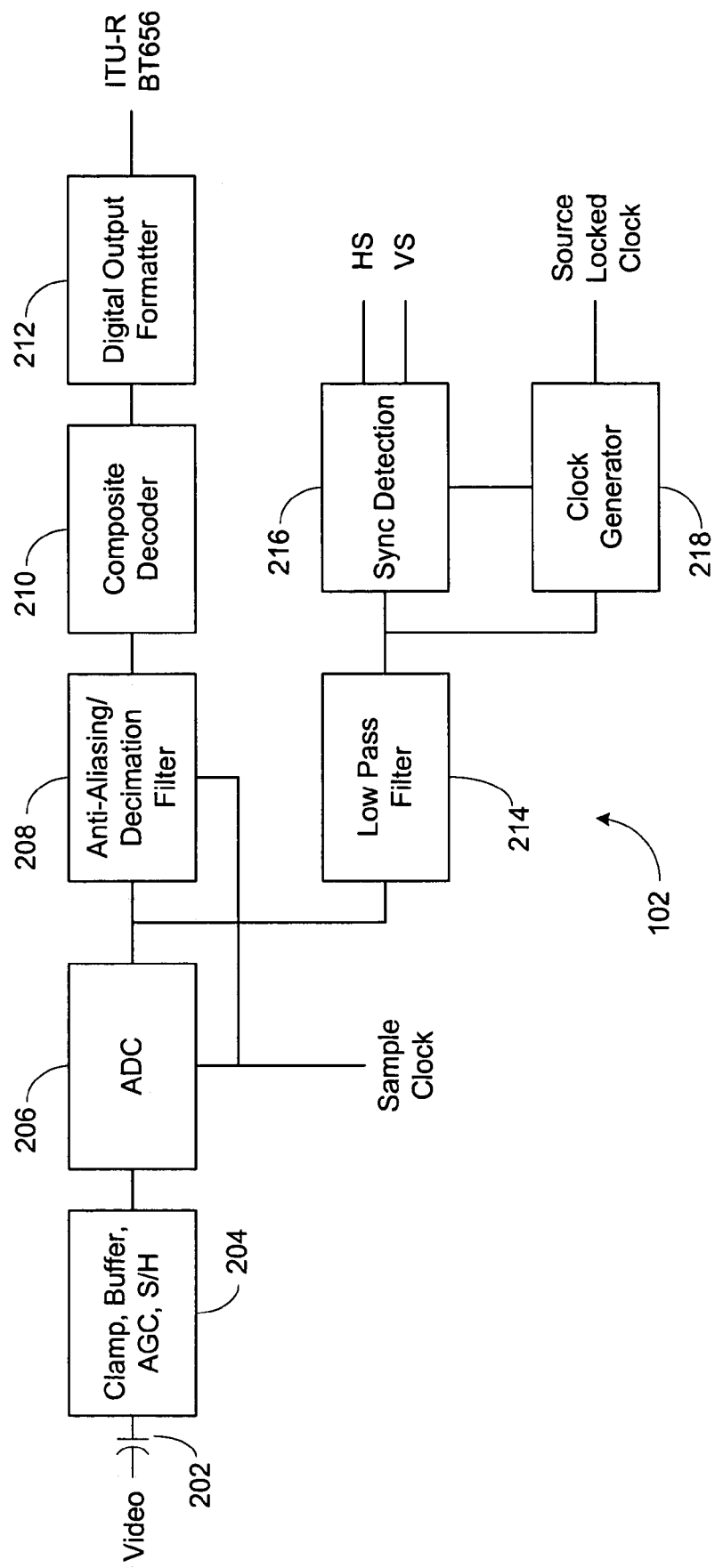
FIG. 2 is a block diagram of an analog video decoder according to the present invention.

A block diagram of an exemplary analog video decoder is shown in FIG. 2. The video signal is provided to an external capacitor 202, and is then provided to a clamp, buffer, automatic gain control (AGC) and sample and hold (S/H) block 204. This block 204 provides clamping of the video signal to ensure it does not exceed limits, impedance buffering and line driving, and automatic gain control and sample and hold. The output of block 204 is then utilized by an analog-to-digital converter (ADC) 206 which does the actual analog-to-digital conversion of the video rate signals. The ADC 206 is preferably operated on a sample clock, which is a free running sample clock and is not locked to the source video in the preferred embodiment. It is understood that in alternate embodiments a source locked clock signal could be used. The output of the ADC 206 is provided to an anti-aliasing/decimation filter 208 because preferably the ADC oversamples the video signal for increased accuracy. The anti-aliasing portion is a low pass filter used to remove sampling alias effects. The decimation filter then reduces the effective sample rate down to the desired rate, such as 27 MHz. The output of the anti-aliasing/decimation filter 208 is provided to a composite decoder 210 in the case of a composite video signal such as NTSC, PAL or SECAM. The composite decoder 210 separates the luma and chroma signals and provides those to a digital output formatter 212, which produces a 4:2:2, eight or ten bit signal according to the ITU-R BT 656 standard.

The output of the analog-to-digital converter 206 is also provided to a low pass filter 214 which removes any of the video content, leaving the sync signals. The output of the filter 214 is then provided to a sync detector 216, having outputs that are horizontal and vertical sync signals. The output of low pass filter 214 is also connected to a clock generator 218, which is effectively a PLL and produces a source locked clock used by other devices, if appropriate. The sync detector 216 is also connected to the clock generator 218 to provide further reference signals to the clock generator 218.

This has been a very simple block diagram and various details of select parts will be provided.

Figure 3:
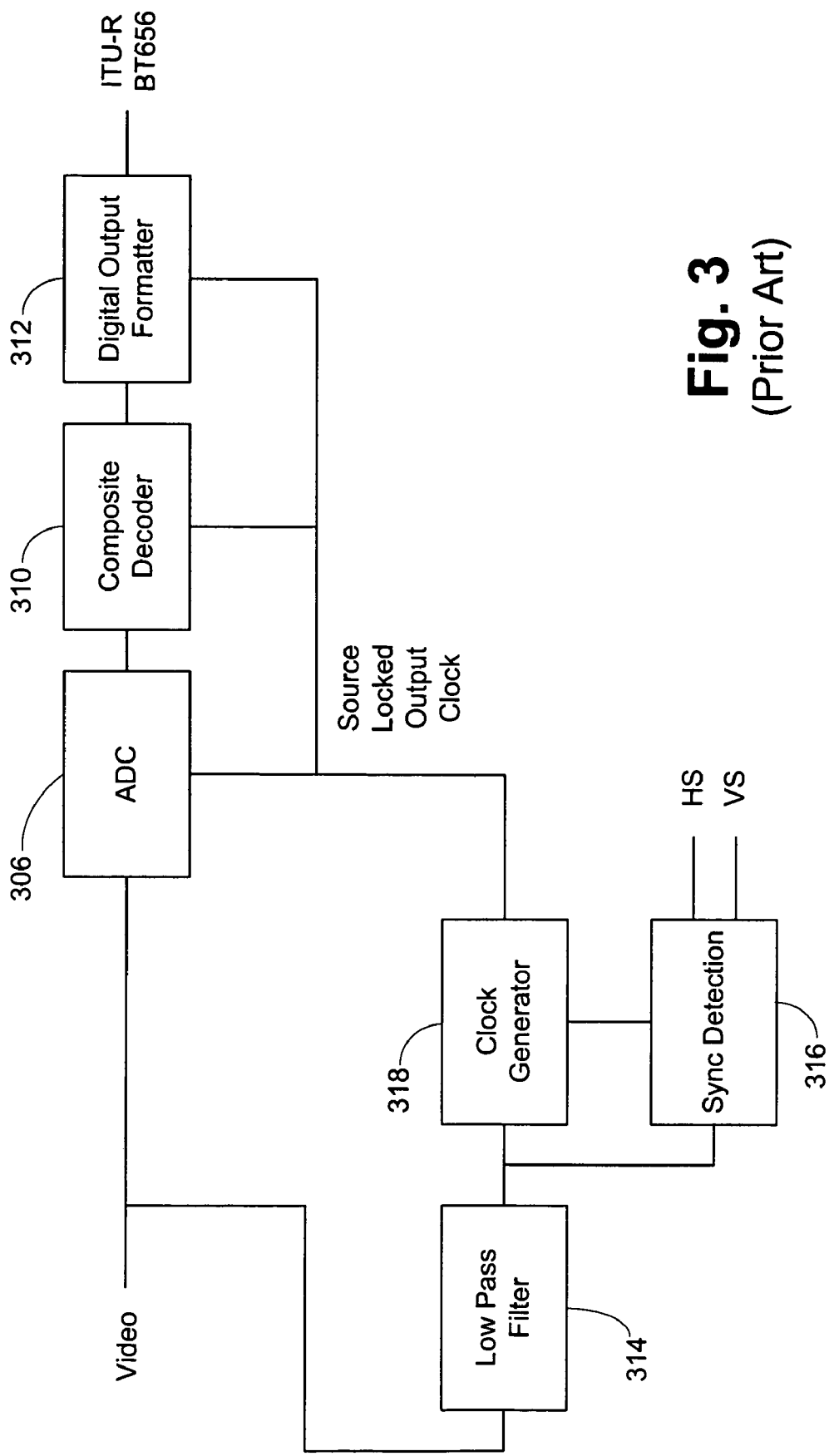
FIG. 3 is a block diagram of a portion of one embodiment of a video decoder according to the prior art.

To fully appreciate the invention, it is considered helpful to review two prior art designs. Referring first to FIG. 3, a low pass filter 314 receives the composite video signal and provides its output to a sync detection circuit 316 and a clock generator 318. For clarity the equivalents to filter 208 have been omitted in this and the following Figures. The clock generator 318 also receives an output from the sync detection circuit 316 and produces a source locked clock output. This source locked clock is used to drive an ADC 306. The output of the ADC 306 is connected to a composite decoder 310 and that output is connected to a digital output formatter 312. Both the composite decoder 310 and the digital output formatter 312 are clocked by a source locked clock from the clock generator 318 which is acting as the output clock.

Because of inaccuracies in the clock generator 318, the source locked clock may have errors as opposed to the actual source clock. These clock errors then produce errors in the ADC 306 and the composite decoder 310. These errors are usually systematic, or with some systematic behavior which creates visible or detectable tones or loss of signal to noise ratio.

Figure 4:
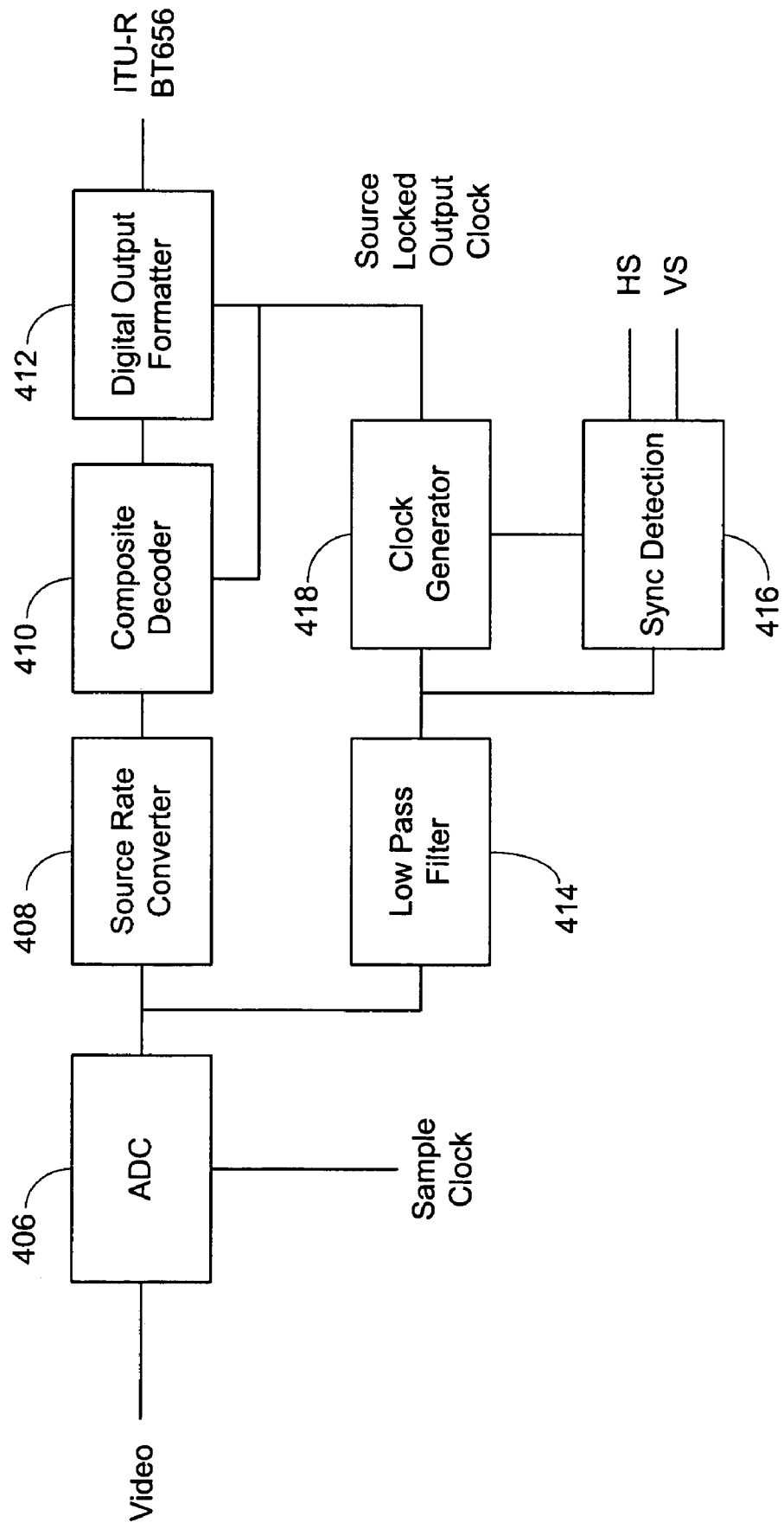
FIG. 4 is a block diagram of a portion of a second embodiment of a video decoder according to the prior art.

FIG. 4 illustrates a slightly improved prior art design. In this case the ADC 406 is driven by a stable sample clock, preferably based on a crystal clock. The output of the ADC 406 is provided to a source rate converter 408 to change from the sample clock to the source locked output clock used by the composite decoder 410 and the output formatter 412. Though not shown, it is understood that the source rate converter 408 receives both the sample clock and the source locked output clock. Now the source locked clock-based errors are removed from the ADC 406, but they still remain in the composite decoder 410.

Figure 5:
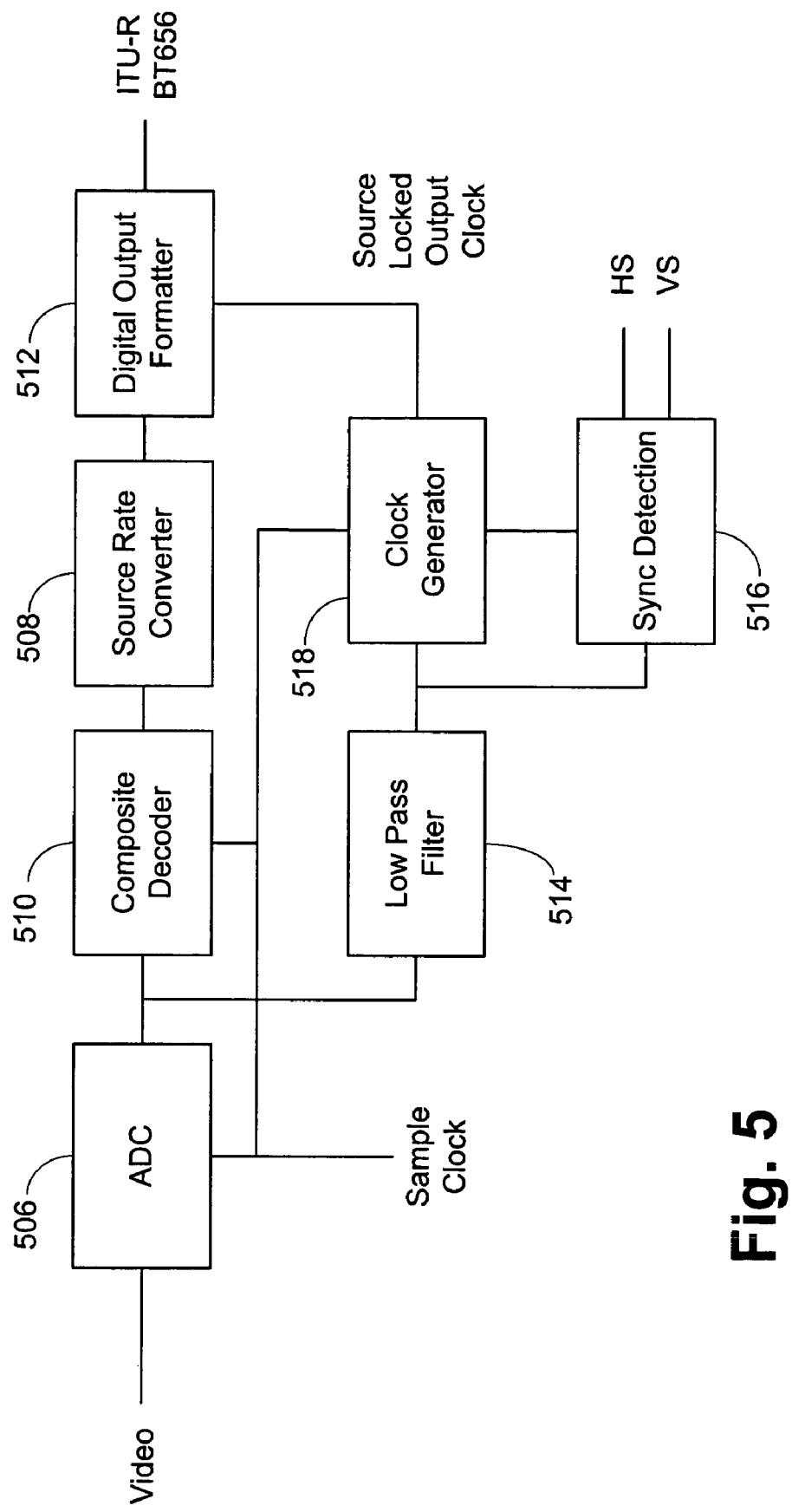
FIG. 5 is a block diagram of portions of a video decoder according to the present invention

FIG. 5 shows a block diagram of portions of a video decoder according to the present invention. In the design of FIG. 5, a composite decoder 510 has been connected to the ADC 506 and both are run from the crystal-locked sample clock. A source rate converter 508 is connected to the composite decoder 510 to provide the proper frequency output to the digital output formatter 512, which is still based on a source locked clock. Again it is understood that the source rate converter 508 receives both the sample clock and the source locked output clock. In certain embodiments the source rate converter 508 can include a FIFO (First In First Out) register as described in U.S. application Ser. No. 10/964,556, entitled "Inverse Tracking Over Two Different Clock Domains," by Dan Gudmundson and John Melanson and filed concurrently herewith, which is hereby incorporated by reference.

In the prior art embodiments, the clock generator 318 or 418, in addition to attempting to provide an error-free clock, had to produce a very uniform clock in that edges had to be provided continuously and uniformly. This requirement further limited the design of the clock generator 318, 418. In a video decoder according to the present invention, a number of different designs can be used for the clock generator 518 because the continuous and uniform restriction has been removed. In the preferred embodiments, both the source rate converter 508 and output formatter 512 can operate from non-uniform clocks, provided that over a given time period the proper number of edges are received. This aspect allows the clock generator 518 to be a fractional N-type frequency synthesizer, a DDS (direct digital synthesizer) or a punctured clock. A punctured clock is one in which the clock will stall in order to create the required number of edges in a desired time period. More details on the clock generator 518 are available in the "Inverse Tracking Over Two Different Clock Domain" application referenced above. This flexibility in clock sources simplifies the design of a video decoder and thus is desirable. In addition, in the preferred embodiments, the clock generator 518 is a numeric clock generator, allowing the accuracy to be selected to meet the design goals. Further, the clock generator 518 is based on the sample clock so that tracking and drift are limited to that of the stable clock source.

By moving the composite decoder 510 ahead of the source rate converter 508 and also running it from the stable sample clock, clock-based errors are dramatically reduced. This provides an improved composite decode so that the luma and chroma values are much more accurate and stable. Further, by moving the decoding elements, namely the ADC and the composite decoder, to a stable sample clock, with the use of a source rate converter connected to the output formatter, greater flexibility is provided in the design of the clock generator driving the output sections of the circuitry. This flexibility eases overall circuit design.

While illustrative embodiments of the invention have been illustrated and described, it will be appreciated that various changes can be made therein without departing from the spirit and scope of the invention.

The invention claimed is:

1. An analog video decoder comprising:
    a video signal input for receiving a composite video signal;
    a stable clock signal source providing a stable clock signal;
    an analog-to-digital converter coupled to said video signal input, coupled to said stable clock signal source to receive said stable clock signal and providing an analog-to-digital converter output;
    a composite decoder having an input coupled to said analog-to-digital converter output, coupled to said stable clock signal source to receive said stable clock signal and providing a composite decoder output;
    a clock generator having an input coupled to said analog-to-digital converter output and providing an output source locked clock signal;
    a source rate converter coupled to said composite decoder output and providing a source rate converter output; and an output formatter coupled to said source rate converter output, coupled to said clock generator output source locked clock signal and providing a digital video signal output.

2. The decoder of claim 1, wherein said clock generator includes a fractional N frequency synthesizer to produce said source locked output clock.

3. The decoder of claim 1, wherein said clock generator includes a direct digital synthesizer to produce said source locked output clock.

4. The decoder of claim 1, wherein said clock generator includes a puncture clock to produce said source locked output clock.

5. The decoder of claim 1, wherein said clock generator can include any of a fractional N frequency synthesizer, a direct digital synthesizer or a puncture clock to produce said source locked output clock.

6. The decoder of claim 1, further comprising:
a gain control circuit coupled between said video signal input and said analog-to-digital converter.

7. A method for decoding an analog composite video signal comprising:
receiving a composite video signal;
providing a stable clock signal;
performing an analog-to-digital conversion on said received composite video signal using said stable clock signal;
composite decoding the output of said analog-to-digital conversion using said stable clock signal;
generating a source locked clock signal from said analog-to-digital conversion output;
performing a source rate conversion of said composite decoding output; and
output formatting said source rate conversion output using said source locked clock signal and providing a digital video signal output.

8. The method of claim 7, wherein generating said source locked output clock includes using a fractional N frequency synthesizer to produce said source locked output clock.

9. The method of claim 7, wherein generating said source locked output clock includes using a direct digital synthesizer to produce said source locked output clock.

10. The method of claim 7, wherein generating said source locked output clock includes using a puncture clock to produce said source locked output clock.

11. The method of claim 7, wherein generating said source locked output clock can include using any of a fractional N frequency synthesizer, a direct digital synthesizer or a puncture clock to produce said source locked output clock.

12. The method of claim 7, further comprising:
providing gain control prior to said analog-to-digital conversion.

* * * * *